United States Patent
Moulon et al.

(10) Patent No.: US 10,132,724 B2
(45) Date of Patent: Nov. 20, 2018

(54) CHECK DEVICE FOR FLIGHT ACTUATOR PRIMARY LOAD PATH FAILURE DETECTION DEVICE

(71) Applicant: Goodrich Actuation Systems SAS, Buc (FR)

(72) Inventors: Thomas Moulon, Ermont (FR); Rui Amaral, Chambly (FR)

(73) Assignee: GOODRICH ACTUATION SYSTEMS, Buc (FR)

( * ) Notice: Subject to any disclaimer, the term of this patent is extended or adjusted under 35 U.S.C. 154(b) by 294 days.

(21) Appl. No.: 15/088,262

(22) Filed: Apr. 1, 2016

(65) Prior Publication Data

US 2016/0304188 A1   Oct. 20, 2016

(30) Foreign Application Priority Data

Apr. 15, 2015 (EP) ..................................... 15305565
Apr. 15, 2015 (EP) ..................................... 15305569

(51) Int. Cl.
*G01M 99/00* (2011.01)
*B64C 13/28* (2006.01)

(52) U.S. Cl.
CPC ........... *G01M 99/008* (2013.01); *B64C 13/28* (2013.01)

(58) Field of Classification Search
CPC .............. G01M 99/008; G01M 99/005; B64C 13/28–13/34; B64C 13/38
USPC ................. 73/1.01, 1.79, 865.6, 865.9, 432.1
See application file for complete search history.

(56) References Cited

U.S. PATENT DOCUMENTS

| | | | |
|---|---|---|---|
| 4,745,815 A | 5/1988 | Klopfenstein | |
| 5,628,477 A | 5/1997 | Caferro et al. | |
| 6,389,915 B1 | 5/2002 | Wngett | |
| 6,578,425 B2 | 6/2003 | Hickman | |
| 6,659,399 B1 | 12/2003 | Bagnoli et al. | |
| 6,672,540 B1 | 1/2004 | Shaheen et al. | |
| 6,704,624 B2 | 3/2004 | Ortega et al. | |
| 6,851,648 B2 | 2/2005 | Perni et al. | |
| 7,686,680 B2 | 3/2010 | Horner et al. | |
| 7,866,602 B2 | 1/2011 | Port-Robach et al. | |

(Continued)

FOREIGN PATENT DOCUMENTS

| | | |
|---|---|---|
| DE | 102007023394 A1 | 5/2007 |
| EP | 1557588 A1 | 7/2005 |

(Continued)

OTHER PUBLICATIONS

Extended European Search Report; Application No. 1530556.9; dated Sep. 17, 2015; 2 pages.

*Primary Examiner* — Robert R Raevis
(74) *Attorney, Agent, or Firm* — Cantor Colburn LLP (57) ABSTRACT

A check device is provided for a flight actuator primary load path failure detection device of the type that disconnects a position sensor from the primary load path in the event of a primary load path failure. The check device comprises: a mechanical linkage for simulating disconnection of the position sensor by permitting relative movement of at least first and second mechanical parts of the actuator that are unable to move relative to one another in normal use without failure of the primary load path, wherein these first and second mechanical parts, include a first mechanical part with movement detected by the position sensor of the primary load path failure detection device.

16 Claims, 9 Drawing Sheets

(56) References Cited

U.S. PATENT DOCUMENTS

| | | | |
|---|---|---|---|
| 7,946,529 B2 | 5/2011 | Moalic et al. | |
| 8,052,084 B2 | 11/2011 | Port-Robach et al. | |
| 8,224,502 B2 | 7/2012 | Brueckner et al. | |
| 8,281,678 B2 | 10/2012 | Cavalier et al. | |
| 8,596,154 B2 | 12/2013 | Cavalier et al. | |
| 8,702,034 B2 | 4/2014 | Moulon et al. | |
| 2007/0018040 A1 | 1/2007 | Wingett et al. | |
| 2008/0116317 A1 | 5/2008 | Steinberg | |
| 2008/0249670 A1 | 10/2008 | Seren et al. | |
| 2008/0315040 A1 | 12/2008 | Moalic et al. | |
| 2010/0001125 A1 | 1/2010 | Cavalier et al. | |
| 2010/0213311 A1 | 8/2010 | Flatt et al. | |
| 2011/0132106 A1 | 6/2011 | Moulon et al. | |
| 2013/0001357 A1 | 1/2013 | Cyrot | |
| 2013/0105623 A1* | 5/2013 | Moulon | B64C 13/28 244/99.4 |

FOREIGN PATENT DOCUMENTS

| | | | |
|---|---|---|---|
| EP | 1972549 A1 | | 9/2008 |
| EP | 2332838 A1 | | 6/2011 |
| FR | 2858035 A1 | | 1/2005 |
| GB | 749253 A | | 2/1956 |
| WO | 2008/112363 | * | 9/2008 |
| WO | 2008112363 A3 | | 9/2008 |
| WO | 2011134799 A1 | | 11/2011 |

* cited by examiner

CHECK DEVICE FOR FLIGHT ACTUATOR PRIMARY LOAD PATH FAILURE DETECTION DEVICE

FOREIGN PRIORITY

This application claims priority to European Patent Application No. 15305565.2 filed on 15 Apr. 2015 and European Patent Application No. 15305569.4 filed on 15 Apr. 2015, the entire contents of which are incorporated herein by reference.

TECHNICAL FIELD

The invention relates to a check device for a flight actuator primary load path failure detection device, the check device hence being for checking operation of a device for detecting breakage of a primary load path of the actuator.

BACKGROUND OF THE INVENTION

Figure 1:
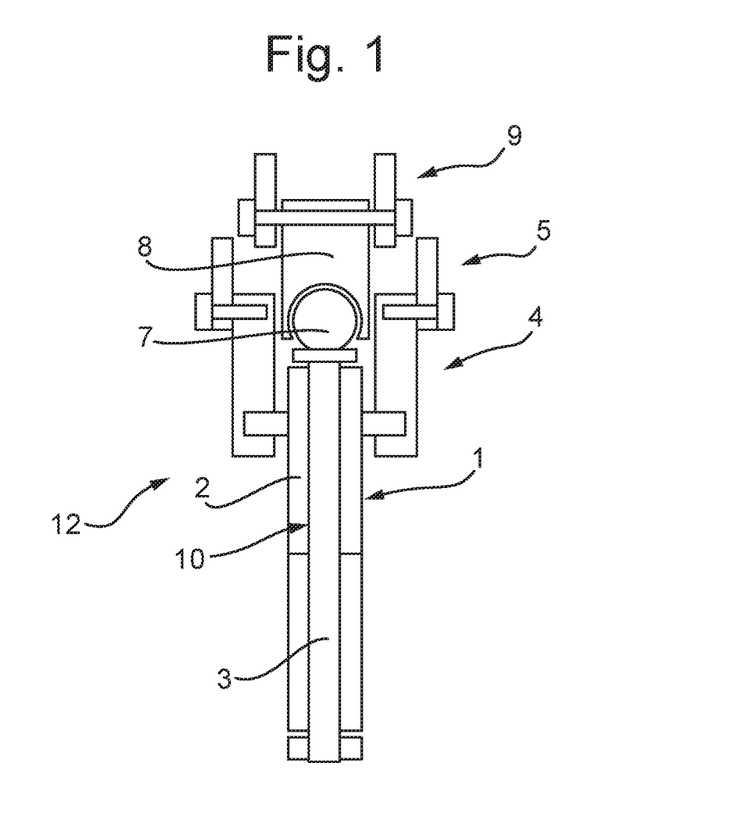
FIG. 1 discloses a prior art flight actuator.

It is well known for flight actuator to include two mechanical load paths, one primary and the other secondary, with the latter intended to take up the load when the primary path has failed. In a typical prior art device, as shown in FIG. 1, when operating on the primary load path the loads are transmitted through a hollow ball or roller screw. The hollow screw houses a safety rod, also called a failsafe bar or tie bar, which is connected to the screw with a small amount of play. During normal operation of the screw, when the primary load path is working correctly, the secondary load path formed by this tie bar carries no load since there is no contact due to the small amount of play. However, in the event of a failure of the screw in the primary load path then the tie bar performs its failsafe function and ensures continuity of the transmission of loads by the actuator.

With reference to FIG. 1 a typical known flight control actuator of the trimmable horizontal stabiliser actuator (THSA) type includes a primary load path with a hollow screw 2 connected at its upper end to the aircraft via a Cardan joint system 4 joining with first aircraft structural elements 5. The primary load path further includes a nut assembly (not shown) mounted on the screw 2, and the nut assembly is connected to the stabiliser of the aircraft, this connection being achieved for example by another Cardan joint system.

The secondary load path is provided by means of a tie bar 3 which is within the screw 2. The tie bar 3 is terminated at its upper end by a male portion, in this case taking the form of a spherical head 7, which is mounted within a recess on a fastening piece 8. The fastening piece 8 is connected to the structure of the aircraft via second aircraft structural elements 9. The known system may also include some means for preventing motion of the nut assembly relative to the screw 2 and/or for fixing the stabiliser in place when the primary load path fails. Thus, the lower attachment, of which the nut assembly is a part, could also include secondary load path elements used when the primary load path fails.

A flight actuator with the basic features discussed above can be found in the prior art, for example in U.S. Pat. No. 8,702,034 and in US 2013/105623.

US 2013/105623 discloses a device for detecting the breakage of a primary path in a flight control actuator, said actuator having a primary path comprising a rotary hollow screw and a secondary path comprising a safety rod that reacts the load passing through the screw. The device of US 2013/105623 comprises a position sensor, connected to the screw, to measure information representative of the angular position thereof, and a disconnection system able to disconnect the screw position sensor in the event of relative movement of the rod with respect to the screw if there is a break in the primary path. Thus, when the primary path fails the disconnection system disconnects the screw position sensor and it is possible for the pilot to be alerted of a primary path failure. Advantageously this prior art system does not need the addition of new sensors to detect the primary path failure, since the position sensor is generally already present for the purpose of determining the position of the screw to thereby determine the actuator position.

Viewed from a first aspect, the invention provides a check device for a flight actuator primary load path failure detection device of the type that disconnects a position sensor from the primary load path in the event of a primary load path failure, the check device comprising: a mechanical linkage for simulating disconnection of the position sensor by permitting relative movement of at least first and second mechanical parts of the actuator that are unable to move relative to one another in normal use without failure of the primary load path, wherein these first and second mechanical parts include a first mechanical part with movement detected by the position sensor of the primary load path failure detection device.

It is known in the prior art for various systems to be provided that give a visual indication or an electrical signal when the primary load path fails. In the example described above in US 2013/105623 a position sensor is disconnected from the primary load path in the event of a primary load path failure. It is of course important to be able to establish with a high degree of certainty that the primary load path failure detection device is operating correctly. If the primary load path were to fail without this becoming known, then there would be a potential for a catastrophic failure of the aircraft should the secondary load path also fail. By the use of a mechanical linkage as set out above it is possible to test both mechanical elements and also electrical elements of the primary load path failure detection device, since the system uses a mechanical movement of the relevant parts and this can be checked by means of electrical signals from the position sensor. No additional sensors are required since the check device makes used of the same sensor as the primary load path failure detection device.

The primary load path failure detection device may be of the type that includes the position sensor as a first position sensor for detecting the position of the primary load path based on movement of the first mechanical part, and also includes a second position sensor for detecting the position of the primary load path based on movement of the second mechanical part. Advantageously the two position sensors and the associated mechanical parts may be elements that are already present in the flight actuator system, hence avoiding the need to introduce additional mechanical or electrical parts for implementation of the primary load path failure detection device. This also minimises the additional parts required for the check device.

The primary load path failure detection device may be of the type that includes a releasable element normally coupled between the mechanical parts and acting to inhibit relative movement thereof and this releasable element may be used as a part of the check device. Thus, the check device may incorporate a releasable element of the primary load path failure detection device, this releasable element being coupled between the mechanical parts as noted above. The releasable element is advantageously arranged to be disconnected upon failure of the primary load path, wherein the disconnection of the releasable element disconnects the position sensor from the primary load path, optionally by disconnection of the first mechanical part from the primary load path.

The releasable element may be a releasable pin element, for example a pin that is in normal use coupled between elements of the primary load path and the secondary load path, and is released upon failure of the primary load path. One possible form for this releasable pin element is a breakable pin (or fuse pin) arranged to be broken when load is transferred from the primary load path to the secondary load path. A suitable breakable pin is disclosed, for example, in US 2013/105623. In this case the release of the pin takes the form of shearing of a part of the pin originally held by the secondary load path, and subsequent freedom of the pin to rotate.

The position sensor, and optionally the second position sensor if present, may be any suitable sensor type, for example a sensor for detecting an angular position of a mechanical part, or a sensor for detecting a linear motion, where the angular position or the linear motion results from a change in position of a drive element of the primary load path, which may for example be a screw.

SUMMARY

In some example embodiments the mechanical parts are gears coupled to a screw in a primary load path of the actuator. The gears may be arranged such that in normal use they rotate together, and the mechanical linkage of the check device may be arranged such that, when actuated, it moves one of the gears relative to the other. Preferably the movement of the gear that is moved is detected by the position sensor. With this arrangement it will be understood that it is easily possible to ensure the correct operation of the primary load path failure detection device since when the mechanical linkage of the check device is actuated then both the mechanical functioning of the gears and the electrical operation of the position sensor will be tested. The primary load path failure detection device should hence provide a signal indicating failure of the primary load path whenever the check device is actuated. The operator can ensure that the primary load path failure detection device is operating correctly by means of the check device and without the need for extensive testing procedures.

One possible form for the mechanical linkage is a connecting rod coupled between a releasable element of the check device (which may be a releasable element of the primary load path failure detection device as discussed above) and the first mechanical part, with the connecting rod arranged to move the first mechanical part relative to the second mechanical part when the mechanical linkage is actuated. In an example the first mechanical part is a first gear, a first end of the connecting rod is mounted on a slider permitting movement of the rod along a radial direction of the gear, and a second end of the connecting rod extends into a slot, the slot having a diagonal extent along both the radial and circumferential directions of the gear. Thus, when the slider moves radially and the first end of the connecting rod therefore moves radially then the second end of the connecting rod is urged along the slot with both radial and circumferential movement resulting in a relative circumferential movement of the gear and the releasable element, and hence simulating temporary disconnection of the gear.

The first end of the connecting rod may be connected to a slider at the releasable element with the second end of the connecting rod extending into a slot formed on the gear. This arrangement enables simple actuation of the mechanical linkage by pushing the slider and/or the releasable element in the radial direction. In this case the slider may be formed as a sleeve coupled to the releasable element, with the releasable element moving with the sleeve and optionally the sleeve also moving relative to the releasable element. Alternatively, it would be possible for the slider to be on the gear and the slot to be formed at the releasable element. The connecting rod might be formed integrally with the slider, or held in a bore on the slider.

The mechanical linkage of the check device may be arranged to be actuated from outside of the flight actuator, i.e. without the need to remove a casing or housing of the flight actuator. In some example embodiments the mechanical linkage is actuated by operation of a button or lever outside of the flight actuator casing, with the operation of the button or lever moving mechanical parts within the casing. The check device may include a button arranged for linear movement and accessible from outside of the flight actuator casing, with the linear movement of the button actuating the mechanical linkage, for example by providing a linear movement of a slider moving a connecting rod as described above.

The mechanical linkage may be provided with a spring return or other resilient mechanism that opposes the forces applied to actuate the mechanical linkage and returns the mechanical linkage to its at rest position after these forces are removed. Where a slider is present, as described above, then there may be a spring return for urging the slider to an at rest position where the first gear moves together with the second mechanical part. This ensures that during normal use the primary load path failure detection device is not activated.

Viewed from a further aspect the invention provides a primary load path failure detection device incorporating a check device as described above. The primary load path failure detection device may have features as described above, and in particular may include a position sensor connected to a screw of the actuator and being for measuring information relating to the position of the screw, along with a disconnection system arranged to disconnect the position sensor from the screw in the event of failure of the primary load path, for example as a result of relative displacement of the screw of the primary load path compared to a rod of a secondary load path of the actuator.

The detection device may include a calculator arranged to receive information from the position sensor, to receive information measured by a second position sensor that is independent of the disconnection system and to compare the information from the two position sensors in order to indicate when there has been a failure of the primary load path.

In a yet further aspect the invention provides an attachment, for example a lower attachment, for a flight actuator, the attachment including a primary load path failure detection device as described above.

In another aspect the invention further provides a flight control actuator including: a primary load path with a hollow screw; a secondary load path having a rod passing through the screw, the secondary load path being arranged to take over the load exerted on the primary load path in the event of a break in the primary load path; and a primary load path failure detection device including a check device as described above.

BRIEF DESCRIPTION OF DRAWINGS

Certain preferred embodiments of the invention will now be described by way of example only and with reference to the accompanying drawings in which.

DETAILED DESCRIPTION OF THE INVENTION

Figure 2:
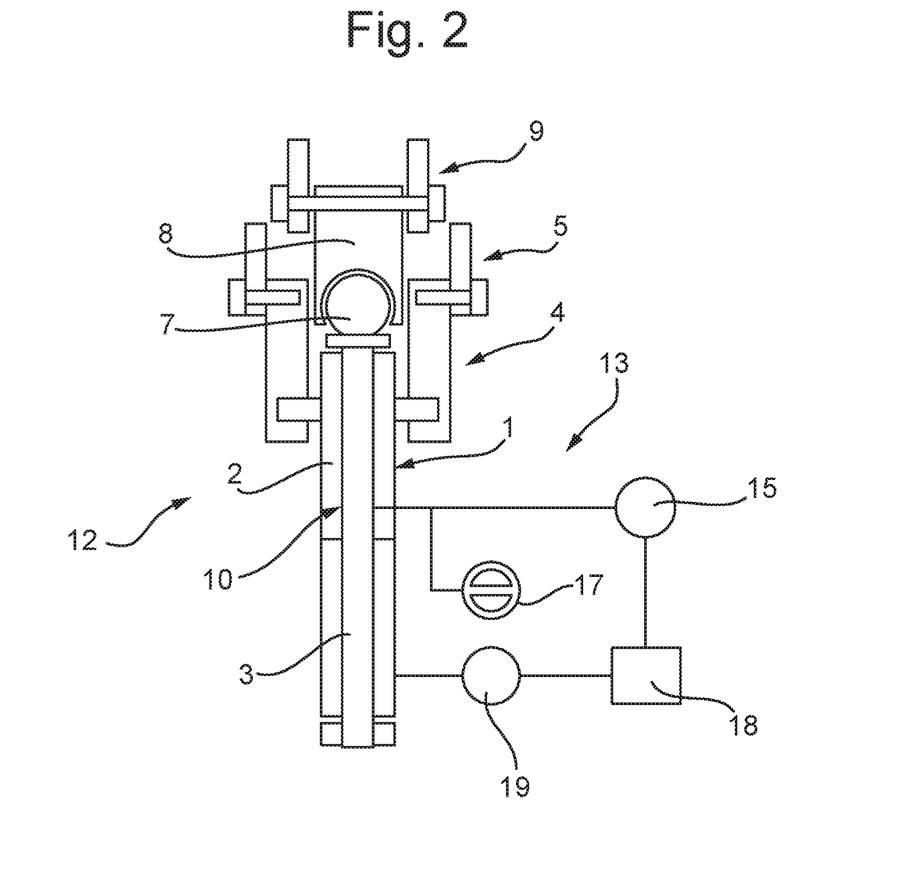
FIG. 2 is a schematic representation of a detection device for detecting primary load path failure in a flight control actuator.

A primary load path failure detection device 13 for a flight control actuator 12 is shown in FIG. 2. The proposed check device may be used with a detection device 13 of this type.

The flight control actuator 12 includes a primary load path 1 and a secondary load path 10. The actuator 12 is, for example, a THSA type actuator for controlling a variable horizontal control surface of an aircraft (not shown). The primary and secondary load paths 1, 10 include numerous elements, and only some of these elements will be described. The basic structure of flight control actuators comprising a primary and a secondary load path is known.

The actuator described here is of a mechanical type, using a rotating screw 2 for driving linear movement. The primary load path 1 thus includes a rotary hollow screw 2 terminating at one of its ends in an attachment member, called the high primary clip 4, through which it is connected to a structure 5 of the aircraft. Generally, the primary load path 1 also includes a nut (not shown) that cooperates with the screw by being assembled thereto and which is connected to the surface to be controlled. The screw 2 is controlled in rotation by a motor, which allows the nut to be moved in translation, the latter being blocked in rotation for this purpose. Movement in translation of the nut thus enables control of the deflection that it is desired to impart to the variable horizontal surface.

A safety rod 3 passes through the interior of the hollow screw 2. The safety rod is one of the elements of the secondary load path 10. Generally, said rod 3 is terminated by a spherical head 7 positioned with some play within a spherical recess of an attachment member 8 of the secondary load path, called the secondary high clip. Said secondary high clip 8 is in its turn connected to the aircraft by means of an aircraft attachment member 9 different from that used to support the primary load path 1. The attachment of the secondary high clip is known per se, and is accomplished in particular by systems employing attachment clevises and screws.

In "normal" operation, it is the primary load path 1 which carries the loads. In the event of failure of the primary load path 1, particularly by breakage of one of the elements constituting the primary load path 1, such as the high primary clip 4 or the screw 2 for example, it is the secondary load path 10 that takes over the load. This fault must be detected, in order to inform the pilot and if appropriate to initiate maintenance operations on the ground or possibly in flight.

The primary load path failure detection device 13 is able to detect such faults. The primary load path failure detection device 13 includes a position sensor 15 connected to the screw 2 to measure information representing its position. The sensor 15 may be an angular position sensor 15. The angular position sensor 15 is configured to measure the angular position of the screw 2 and/or its angular displacement. This may involve angular displacement and/or angular positioning, which can be absolute or relative depending on the conventions selected. Therefore, when the sensor 15 and the screw 2 are connected, the sensor 15 measures the angular position of the screw 2. The angular position sensor 15 can for example be an active electrical (inductive) rotational displacement measurement sensor of the RVDT (Rotary Variable Differential Transformer) type. Other angular position sensors can be used.

Alternatively, the information representing the position of the screw may involve a linear position sensor, such as a linear displacement measurement sensor of the LVDT (Linear Variable Differential Transformer) type. In that case, the linear position sensor 15 is connected to the screw 2 via a ballscrew type mechanism for example, which transforms the rotary motion of the screw 2 into a translatory motion. The linear position sensor 15 therefore measures a position or displacement that is linear, but represents the angular position of the screw 2.

Any position sensor 15 capable of measuring information representing the position of the screw 2 can be used, that is to say that the information measured (a position for example) is correlated to the angular position of the screw 2 and thus allows the position of the screw to be deduced.

The primary load path failure detection device 13 includes a disconnection system 17 capable of disconnecting the screw 2 from the position sensor 15 in the event of a relative displacement of the rod 3 with respect to the screw 2 upon a break of the primary load path 1. Said disconnection therefore brings about the breakage of the connection between the sensor 15 and the screw 2. Advantageously, the disconnection system 17 is calibrated to disconnect the connection between the screw 2 and the sensor 15 only in the event of a break of the primary load path 1.

In the event of breakage of an element of the primary load path 1, it is the secondary load path 10 which takes over the load. The rod 3 then undergoes a relative displacement with respect to the screw 2, said displacement being substantially oriented parallel to the screw 2, in a translator motion in one direction or in the other. With this type of system, the relative displacement of the rod 3 with respect to the screw 2 is detected by the disconnection system 17, which then brings about a disconnection between the screw 2 and the position sensor 15. Said disconnection is triggered at the time that the relative displacement of the rod 3 with respect to the screw 2 or the magnitude of the load applied to the rod 3 exceeds a predetermined threshold for displacement or load, this threshold corresponding to a break of the primary load path 1. The threshold may, for example, be found from a simulation or from an in situ measurement. The aim is to avoid spurious detections due to relative motion between the screw 2 and the rod 3 and/or loads on the rod 3 that are not the result of a failure of the primary load path 1. Only a large enough load or a relative displacement of the rod 3 with respect to the screw 2 above the threshold corresponds to a failure of the primary load path 1.

Below the predetermined threshold, the disconnection system 17 does not cut the connection between the screw 2 and the position sensor 15, which avoids spurious detections. The disconnection system may include a sensor or sensor suite measuring the relative movement of the rod 3 with respect to the screw 2 (or conversely), which makes it possible to disconnect the screw 2 from the position sensor 15 only in the event of a break of the primary load path 1. Alternatively, the disconnection system 17 is configured to disconnect the position sensor 15 from the screw 2 when the rod 3 exerts a predetermined load on the screw 2, corresponding to a mechanical force exerted by the rod 3 on the screw 2 upon a break of the primary load path 1. Thus, a threshold for detecting failure of the primary load path may be implemented with a solely mechanical system, avoiding the need for additional electrical components. In the event of a break of the primary load path, the rod 3 moves relative to the screw 2 and thereupon exerts a mechanical load on the screw 2 that is greater than a predetermined threshold, said mechanical load being used by the disconnection system 17 to mechanically disconnect the screw 2 from the position sensor 15 in the event of a break in the primary load path 1.

The primary load path failure detection device 13 additionally includes a calculator 18 configured to compare the information representing the angular position of the screw 2 measured by the position sensor 15 and information representing the angular position of the screw 2 measured by a second position sensor 19 of the detection device 13. When the position sensor 15 is disconnected then information from the two sensors will not in agreement. It is therefore straightforward to determine when a failure of the primary load path is indicated by the primary load path failure detection device 13.

The information representing the angular position of the screw 2 measured by the second position sensor 19 can be the angular position itself or it may be a measurement of a linear position as mentioned above. The second position sensor 19 differs from the sensor 15 in that it is not connected to the screw 2 via the disconnection system 17. The second position sensor 19 is therefore independent of the disconnection system 17. Besides this difference, it is typically a sensor of the same type, capable of measuring information representing the angular position of the screw 2. If the two sensors are identical then it is simple to compare their outputs to identify a primary load path failure.

This second position sensor 19 can be an angular position sensor belonging to the aircraft itself, used to control and slave the rotation of the screw 2 in "normal" operation. It can advantageously be in particular an angular position sensor connected with the screw 2 and existing in all flight control actuators, which avoids installing new sensors. Advantageously, the position sensor 15 and the second position sensor 19 are incorporated into one and the same multichannel sensor.

The primary load path failure detection device 13 therefore allows the use of sensors already present on the aircraft, by simply integrating the detection device 13, and particularly the disconnection system 17, into the actuator.

Figure 3:
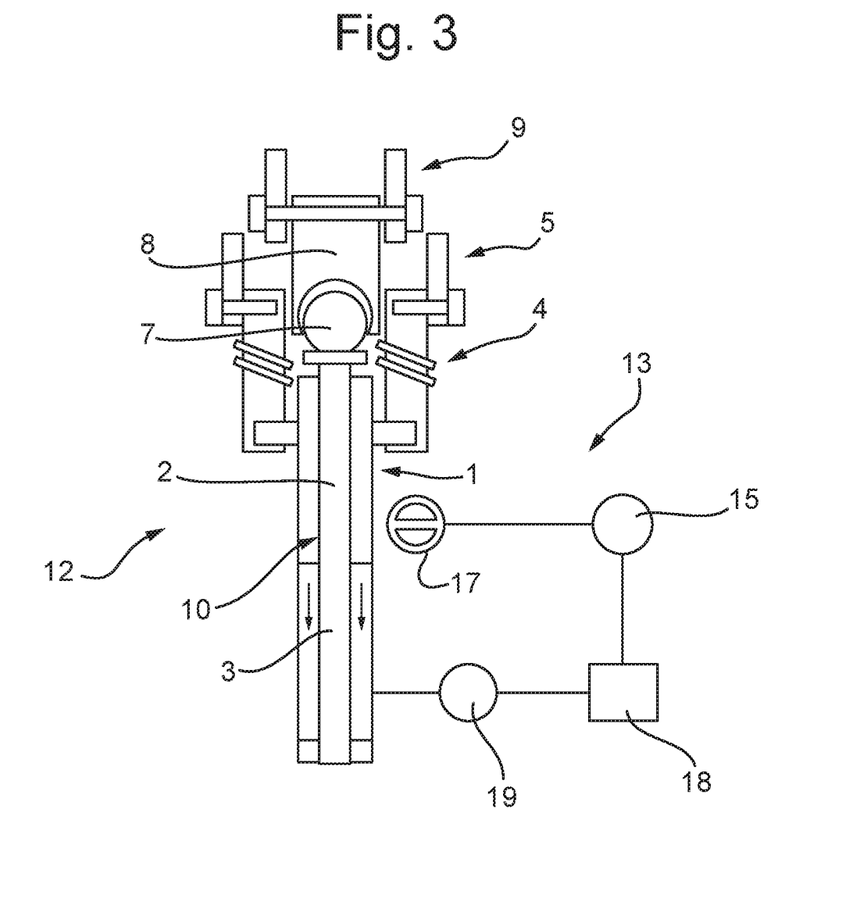
FIG. 3 shows the detection device and actuator of FIG. 2 when the primary load path has failed.

FIG. 3 shows a break of the primary load path 1 and a load takeover by the secondary load path 10. The breakage is illustrated at the location of the primary high clip 4, but may occur on any element participating in the primary load path 1 of the actuator. Prior to said breakage, that is to say during "normal" operation, the sensor 15 is connected to the screw 2 and therefore measures information representing the angular position of the screw 2. Furthermore, the screw 2 is controlled in rotation by the pilot via the flight commands that he communicates to the aircraft. Information representing the angular position of the screw 2 is measured by a second position sensor 19 which for its part continues to measure information representing the angular position of the screw 2 even in the event of a break in the primary load path 1, because it is not connected to the screw 2 via the disconnection system 17.

In the event of a break in the primary load path 1, it is the secondary load path 10 that bears the load. In this case, the rod 3 undergoes a relative displacement with respect to the screw 2, said displacement exceeding a predetermined threshold characteristic of a break of the primary load path 1.

When this displacement exceeding the threshold occurs, the disconnection system 17 brings about cutting of the connection between the screw 2 and the position sensor 15. Consequently, the sensor 15 no longer measures information representing the angular position of the screw 2. The position sensor 15 then measures a signal that is zero or constant, which allows detection of the break of the primary load path 1 and hence of the fault. The second sensor 19 continues to measure information representing the angular position of the screw 2 and the variations in said positioning.

If the calculator 18 compares the signal from the second sensor 19 with the signal measured by the position sensor 15 that has been disconnected from the screw 2 by the disconnection system 17, it is clear that the signals will be different, while prior to the fault these were equal or at least correlated. The calculator 18 is configured to detect a fault when the comparison between the information measured by the position sensor 15 and the information measured by the second position sensor 19 is greater or less than a predetermined threshold.

Figure 4:
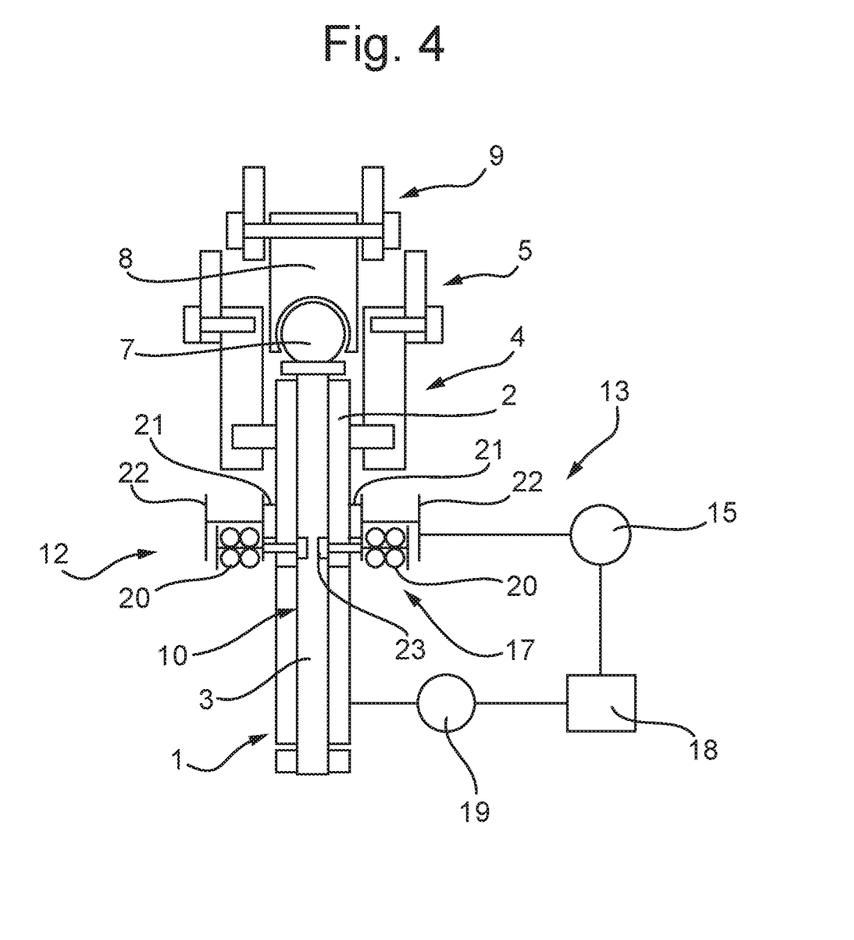
FIG. 4 is a schematic representation of a flight control actuator similar to FIG. 2 with a detection device shown in greater detail.

FIG. 4 shows a primary load path failure detection device 13 in more detail. In this device 13 the disconnection system 17 includes a breakable pin 23, also known as a fuse pin. Said breakable pin 23 has a cross-section calibrated so as to break at a predetermined load, corresponding to a mechanical load exerted by the rod 3 on the screw 2 upon a break in the primary load path 1 (breakage of the screw or of another element of the primary load path 1). This allows the disconnection system 17 to operate automatically upon failure of the primary load path 1 with only mechanical components and no further sensors or the like. The pin 23 can be placed in a slot running through the screw 2 and the rod 3, or be screwed into a recess grooved for this purpose. In addition, the axis of said breakable pin 23 is subjected to a predetermined extraction load, allowing extraction of the pin 23 from the screw 2 in the event of breakage of said pin 23. Said extraction load is exerted by pins 20, at right angles to the screw 2. The breakable pin 23 may connect the screw 2 to a pinion 22 which, via a gear train, drives the position sensor 15, for example an angular position sensor driven in rotation.

Figure 5:
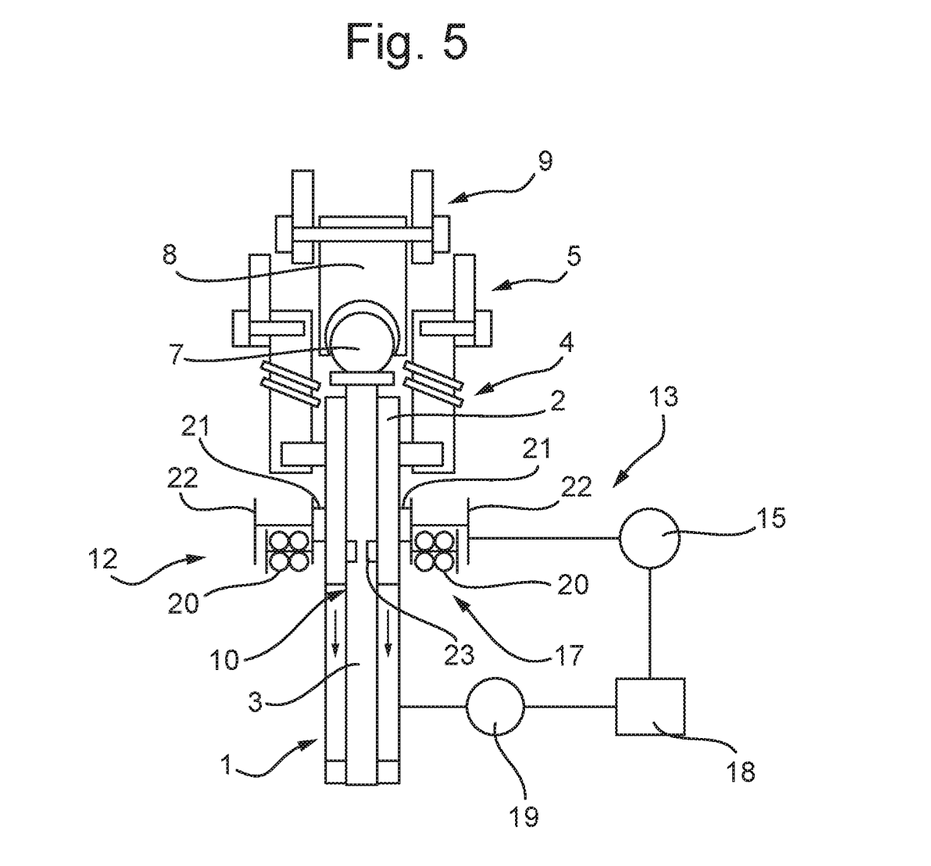
FIG. 5 shows the detection device and actuator of FIG. 2 when the primary load path has failed.

In the event of a break in the primary load path 1, and as illustrated in FIG. 5 the rod 3 exerts a mechanical load above the breakage threshold of the pin 23, and this causes the pin 23 to break. Due to the spring load exerted on the pin 23, it disengages from the screw 3. In disengaging, the pinion 22 becomes free to rotate, thanks in particular to a bearing 21. The pinion 22 therefore no longer follows the rotation of the screw 2, which means that the sensor 15 no longer measures information representing the angular position of the screw 2, and is disconnected from said screw 2, which allows detection of a break in the primary load path 1.

When the calculator 8 compares the signal measured by the position sensor 15 with the signal measured by the second position sensor 19, it detects a fault when the comparison is greater (or less, as the case may be) than a predetermined threshold.

It is desirable to be able to test the primary load path failure detection device 13 in order to ensure that it is working correctly. Clearly, the disconnection device 17 could be tested by loading the secondary load path, but this is undesirable as it would involve significant intervention on the aircraft, potentially through uncoupling the primary load path, and it could also involve irreversible changes to some components, for example the breakable pin 23. Thus, an additional mechanism for checking the detection device would provide advantages, especially if it were possible to check the detection device without the need to uncouple the primary load path or to damage breakable elements of the primary load path failure detection device 13.

Figure 6:
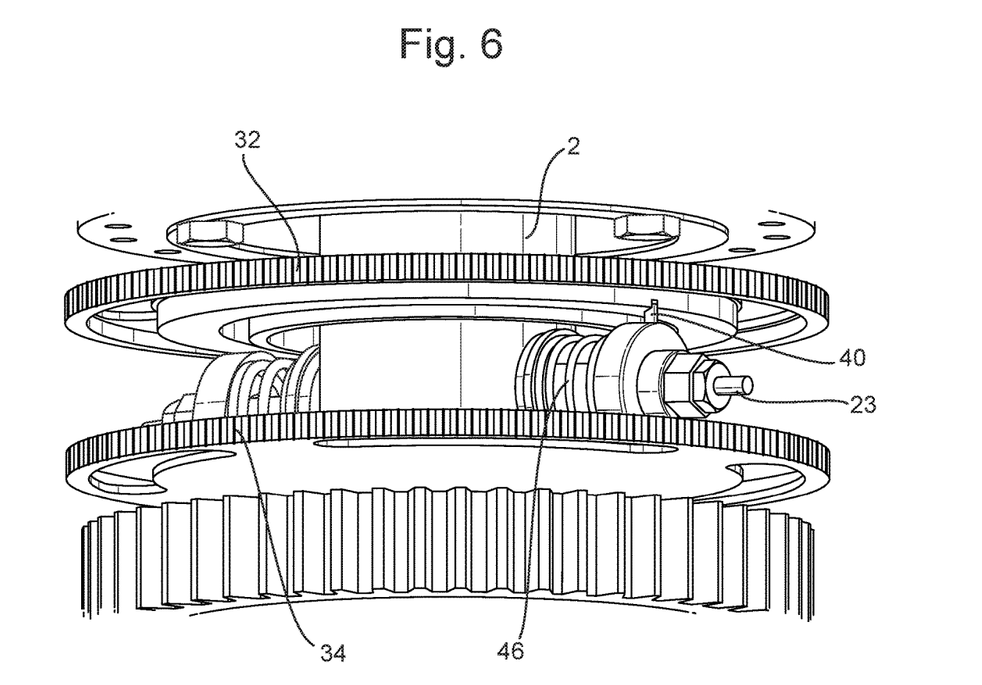
FIG. 6 illustrates parts of an actuator including a detection device for detecting primary load path failure as well as a check device for ensuring that the detection device is operating correctly.
Figure 7:
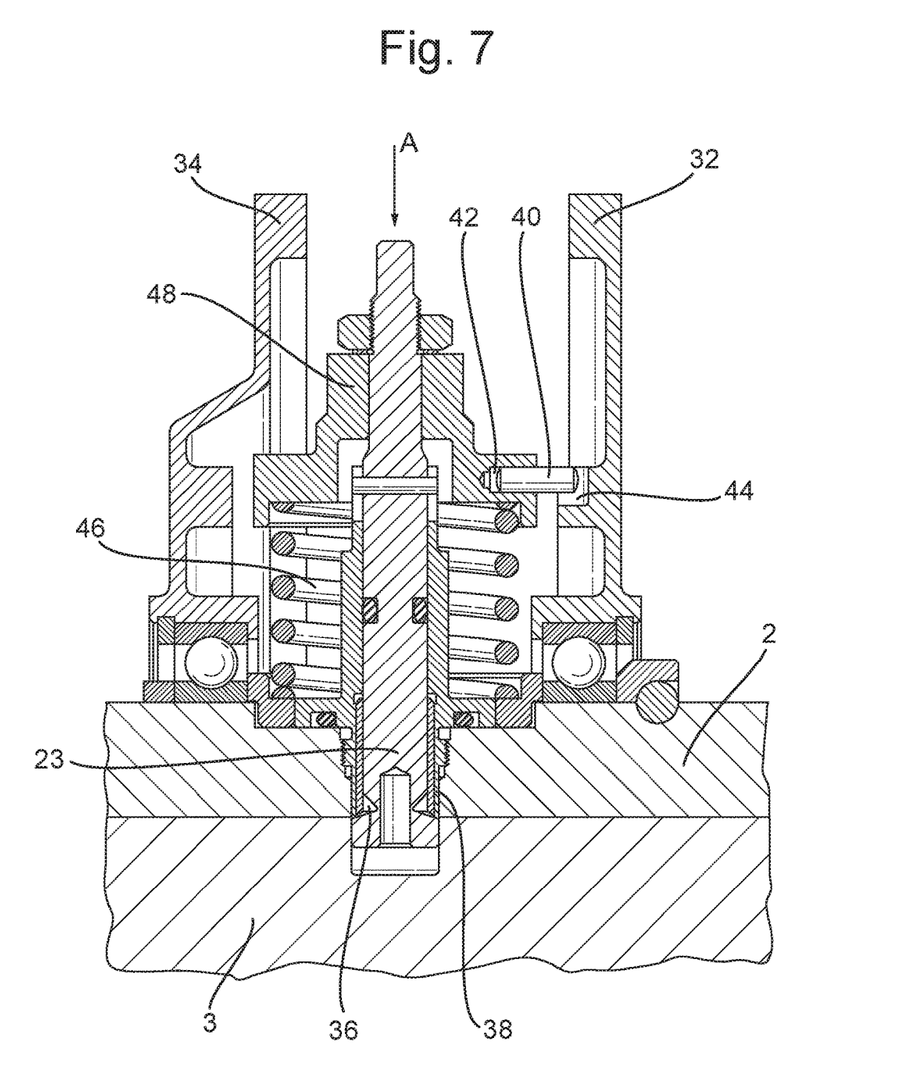
FIG. 7 shows similar parts to FIG. 6 in cross-section.

FIGS. 6 and 7 show an example arrangement for a primary load path failure detection device 13 adapted to include a check device. In this example, operation of the primary load path failure detection device 13 is similar to that described above for FIGS. 4 and 5. The screw 2, which passes vertically through the centre of the elements shown in FIG. 6, is coupled to mechanical parts in the form of feedback gears 32, 34, which are themselves coupled to suitable position sensors, for example RVDT sensors. In normal use both of the two feedback gears 32, 34 rotate with the screw 2, and hence they both provide the same indication of the position of the screw 2. The first feedback gear 32 can be connected to the position sensor 15 of the failure detection device 13, and the second feedback gear 34 can be connected to the second position sensor 19 of the failure detection device 13. As described above, when the primary load path fails then the failure detection device 13 will disconnect the position sensor 15 so that there are different readings provided by this sensor and the second position sensor 19. In this example this is achieved via two breakable pins 23, which are mounted symmetrically about the screw 2 and are described in more detail below.

The check device is implemented in such a way that when actuated it brings about a temporary disconnection or uncoupling between the position sensor 15 and the screw 2, thereby simulating a failure of the primary load path. In this example the temporary uncoupling is achieved through a mechanical system that permits relative movement of the first and second feedback gears 32, 34 compared to the screw 2, and relative movement of the first feedback gear 32 compared to the second feedback gear 34. This results in differing readings from the position sensor 15 and the second position sensor 19, which means that the failure of the primary load path is immediately evident and easily detected.

Considering the example arrangement of the breakable pin 23 in more detail, with particular reference to FIG. 7, as seen in the cross-section the breakable pin 23 in this example has a neck part 36 located across a join between a rod 3 of the secondary load path of the actuator and a screw 2 on the primary load path. As discussed above, when the primary load path fails then there will be an axial load on the rod 3, which urges the rod 3 to displace axially relative to the screw 2. The axial load, when beyond a certain threshold, will break the breakable pin 23 at the neck 36. The neck 36 is carefully calibrated so that it breaks at a suitable threshold indicative of failure of the primary load path, and so that it does not break during normal use when there is no significant loading through the secondary load path and the primary load path carries the load on the actuator.

There are two breakable pins 23 on opposite sides of the screw 2 as shown in FIG. 6. One pin 23 is connected to the first feedback gear 32, and the other pin 23 is connected to the second feedback gear 34. The pins 23 form a part of the coupling between the feedback gears 32, 34 and the screw 2, and enable linked movement of the feedback gears 32, 34 and the screw 2 during normal use when the primary load path is intact.

FIG. 7 also shows the connections between the two feedback gears 32, 34 and the screw 2 as well as the connections between one of the breakable pins 23 and the first feedback gear 32. During normal use, when the breakable pins 23 are intact then both of the two feedback gears 32, 34 will rotate to the same angular position dependent on the position of the screw 2. However, when the breakable pins 23 have sheared then the two feedback gears 32, 34 will no longer rotate together. Instead, gearing 38 in conjunction with bearings attaching the feedback gears 32, 34 to the shaft have the effect that the second feedback gear 34 and the first feedback gear 32 will no longer rotate with the screw 2 and are decoupled from each other. Thus, the sensors 15, 19 attached to the feedback gears 32, 34 can be used to provide an indication of failure of the primary load path in the manner described above, for example using a calculator 18, since the two gears 32, 34 will appear to show different positions for the screw 2.

Figure 8:
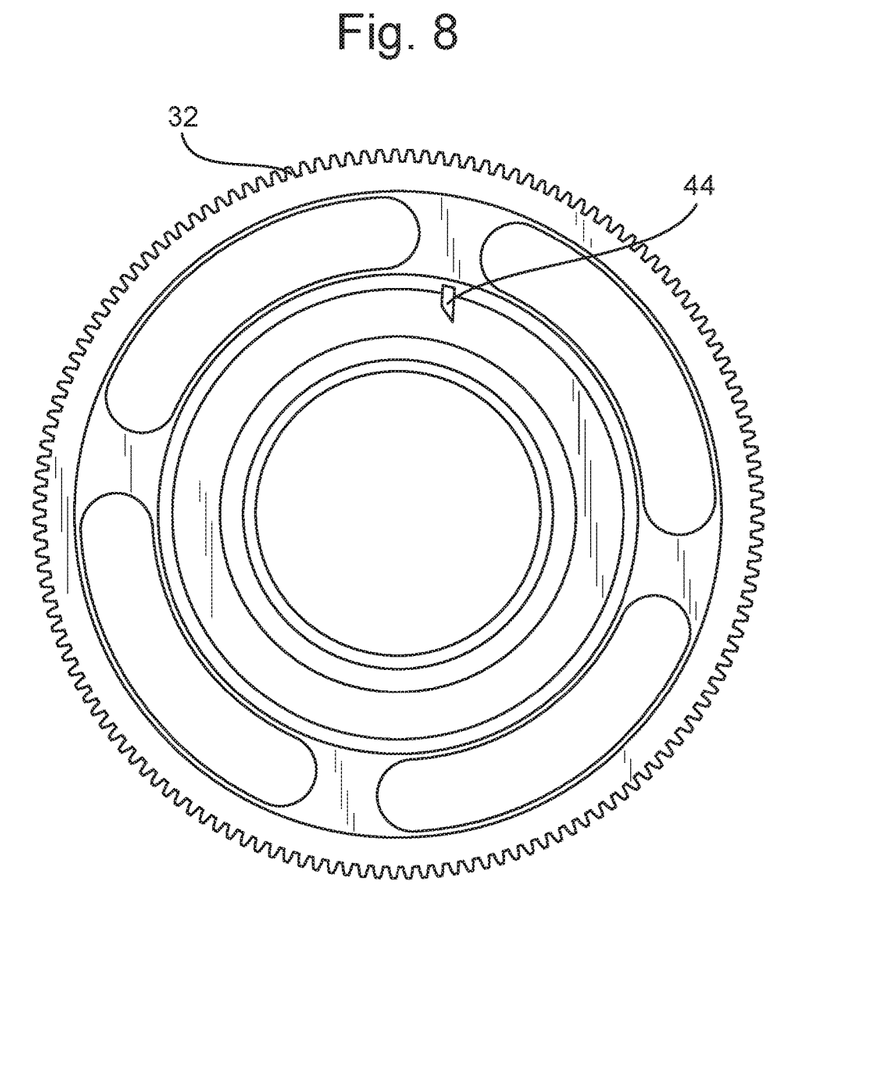
FIG. 8 shows a feedback gear from actuator angular position measuring system and illustrates the link between the feedback gear and the check device of FIGS. 6 and 7.

A small connecting rod 40 is coupled between the breakable pin 23 and the first feedback gear 32 in such a way as to restrict relative rotational movement. The connecting rod 40 is located in a bore 42 on the one side and a diagonal slot 44 on the other side. The diagonal slot 44 is diagonal in the sense that it extends both radially and circumferentially relative to the gear 32. In the example shown in the drawings the bore 42 is coupled to the pin 23 and the slot 44 is formed on the gear 32, although it will of course be appreciated that the opposite arrangement could be used. FIG. 8 shows the diagonal slot in perspective view. It will be appreciated that a radial movement of the connecting rod 40 relative to the gear 32 will result in a rotational movement of the gear 32. During normal operation the connecting rod 40 does not move radially and so the feedback gears 32, 34 move together. When it is required to test the operation of the primary load path failure detection device 13 then the connecting rod 40 is moved radially in order to shift the first feedback gear 32 relative to the second feedback gear 42. As a result, a discrepancy is introduced between the measurements from the position sensor 15 and the second position sensor 19. This means that both mechanical and electrical aspects of the primary load path failure detection device 13 can be tested, since during radial displacement of the connecting rod 40 and the consequent rotational movement of the first feedback gear 32 then a failure of the primary load path is simulated.

In this example radial movement of the connecting rod 40 is achieved by radial movement of the breakable pin 23 prompted by a force in the direction shown in FIG. 7 by the arrow A. This force pushes the breakable pin 23 inwards compressing a spring 46 and also moving the connecting rod 40 radially inwards, thereby turning the first feedback gear 32. It will be seen that the connecting pin 40 is held in a bore 42 on a collar 48 attached to the breakable pin and movable there with as the spring 46 compresses. When the force in the direction A is removed then the spring causes the assembly to move back to its normal position, returning the connecting rod 42 its usable position and rotating the first feedback gear 32 back into alignment with the second feedback gear 34.

Thus, it will be understood that through this simple arrangement, and without the need for any additional sensors or complex components, it becomes straightforward to simply test the mechanical and electrical components of the primary load path failure detection device 13 by allowing for a temporary uncoupling simulating breakage of the primary load path.

Figure 9:
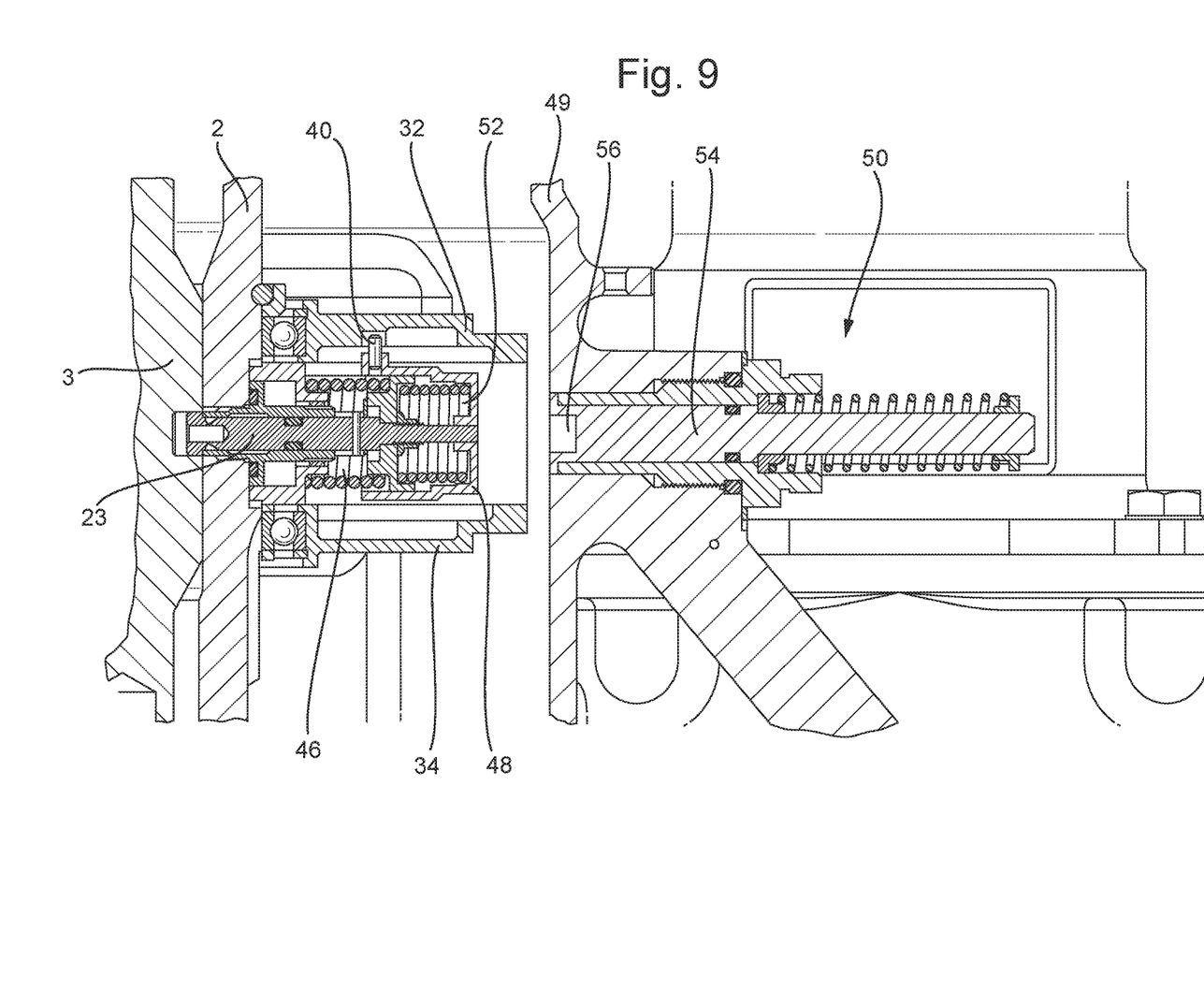
FIG. 9 is a cross-section of a similar check device to that of FIGS. 6 and 7, when integrated into a casing having an external actuator for the check device.

A further example arrangement for a check device is shown in FIG. 9, and this Figure also shows. The device in situ within a casing 49, with the casing 49 being provided with an external actuator 50 that allows the check device to be actuated from outside of the casing 48. It will be seen that the check device of FIG. 9 also includes an additional feature to that of FIGS. 6 and 7, since as well as a spring 46 for compression when the breakable pin 23 is pushed inwards, the device of FIG. 9 also has the collar 48 attached to the breakable pin 23 in a manner that allows for relative radial movement, with a further spring 52 being compressed when the collar 48 is pushed inward relative to the breakable pin 23. This mechanism allows for a greater radial movement of the connecting rod 40, as the collar 48 can move beyond the extent of the range of movement of the breakable pin 23. It will however be appreciated that the arrangement of FIG. 7 could replace the arrangement of FIG. 9 and be used in a similar casing 49 with a similar external actuator 50.

Considering the external actuator 50 in more detail it will be seen that this takes the form of a spring-loaded pushbutton 54 that passes through seals in the casing 49 in order to apply a force on the collar 48 and on the breakable pin 23. In the example of FIG. 9 where the collar can move relative to the breakable pin 23 then the pushbutton 54 has, at its end, a recess 56 to accommodate the relative movement. It will of course be appreciated that this recess 56 might not be necessary in the case that a slightly simpler arrangement of FIG. 7 was used.

The invention claimed is:

1. A check device for a flight actuator primary load path failure detection device of the type that disconnects a position sensor from the primary load path in the event of a primary load path failure, the check device comprising:
a mechanical linkage for simulating disconnection of the position sensor by permitting relative movement of at least a first mechanical part of the actuator and a second mechanical part of the actuator that are unable to move relative to one another in normal use without failure of the primary load path, wherein the first and second mechanical parts each include a first part with movement detected by the position sensor of the primary load path failure detection device.

2. A check device as claimed in claim 1, being for a primary load path failure detection device of the type that includes the position sensor as a first position sensor for detecting the position of the primary load path based on movement of the first mechanical part, and also includes a second position sensor for detecting the position of the primary load path based on movement of the second mechanical part.

3. A check device as claimed in claim 1, wherein the primary load path failure detection device is of the type that includes a releasable element normally coupled between the mechanical parts and acting to inhibit relative movement thereof and this releasable element is used as a part of the check device.

4. A check device as claimed in claim 3, wherein the releasable element is arranged to be disconnected upon failure of the primary load path, wherein the disconnection of the releasable element disconnects the position sensor from the primary load path by disconnection of the first mechanical part from the primary load path.

5. A check device as claimed in claim 3, wherein the releasable element is a releasable pin element that is in normal use coupled between elements of the primary load path and the secondary load path and is released upon failure of the primary load path.

6. A check device as claimed in claim 1, wherein the check device includes a releasable element of the primary load path failure detection device, this releasable element being coupled between the first and second mechanical parts.

7. A check device as claimed in claim 1, wherein the mechanical parts are gears coupled to a screw in a primary load path of the actuator, the gears being arranged such that in normal use they rotate together, and the mechanical linkage of the check device being arranged such that, when actuated, it moves one of the gears relative to the other.

8. A check device as claimed in claim 1, wherein the mechanical linkage comprises a connecting rod coupled between a releasable element of the check device and the first mechanical part, with the connecting rod arranged to move the first mechanical part relative to the second mechanical part when the mechanical linkage is actuated.

9. A check device as claimed in claim 8, wherein the first mechanical part is a first gear, a first end of the connecting rod is mounted on a slider permitting movement of the rod along a radial direction of the gear, and a second end of the connecting rod extends into a slot, the slot having a diagonal extent along both the radial and circumferential directions of the gear.

10. A check device as claimed in claim 9, wherein the first end of the connecting rod is connected to a slider at the releasable element with the second end of the connecting rod extending into a slot formed on the gear.

11. A check device as claimed in claim 1, wherein the flight actuator includes a casing and wherein the mechanical linkage is arranged to be actuated from outside of the flight actuator without the need to remove the casing of the flight actuator by operation of a button outside of the flight actuator casing.

12. A primary load path failure detection device incorporating a check device as claimed in claim 1.

13. A primary load path failure detection device as claimed in claim 12, wherein the primary load path failure detection device includes a releasable element normally coupled between the mechanical parts and acting to inhibit relative movement thereof, and this releasable element is used as a part of the check device.

14. A primary load path failure detection device as claimed in claim 12, the detection device including the position sensor as a first position sensor for detecting the position of the primary load path based on movement of the first mechanical part, and also including a second position sensor for detecting the position of the primary load path based on movement of the second mechanical part.

15. An lower attachment for a flight actuator, the attachment including a primary load path failure detection device as claimed in claim 12.

16. A flight control actuator including: a primary load path with a hollow screw; a secondary load path having a rod passing through the screw, the secondary load path being arranged to take over the load exerted on the primary load path in the event of a break in the primary load path; and a check device as claimed in claim 1.

* * * * *